US010091108B2

(12) United States Patent
Lin et al.

(10) Patent No.: US 10,091,108 B2
(45) Date of Patent: Oct. 2, 2018

(54) METHOD FOR PACKET FORWARDING BASED ON EQUAL-COST MULTI-PATH AND NETWORK DEVICE (71) Applicant: Huawei Technologies Co., Ltd., Shenzhen (CN)

(72) Inventors: Zhongfang Lin, Nanjing (CN); Guangrui Wu, Nanjing (CN); Ying Xie, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 106 days.

(21) Appl. No.: 15/274,522

(22) Filed: Sep. 23, 2016

(65) Prior Publication Data

US 2017/0093718 A1 Mar. 30, 2017

(30) Foreign Application Priority Data

Sep. 24, 2015 (CN) .......................... 2015 1 0615948

(51) Int. Cl.
*H04L 12/743* (2013.01)
*H04L 12/707* (2013.01)
(Continued)

(52) U.S. Cl.
CPC .......... *H04L 45/7453* (2013.01); *H04L 45/12* (2013.01); *H04L 45/24* (2013.01); *H04L 47/34* (2013.01); *H04L 61/2007* (2013.01)

(58) Field of Classification Search
CPC ..... H04L 45/7453; H04L 45/24; H04L 47/34; H04L 61/2007; H04L 45/12
See application file for complete search history.

(56) References Cited

U.S. PATENT DOCUMENTS 9,906,592 B1 * 2/2018 Roitshtein ........... H04L 67/1036
2009/0252036 A1 10/2009 Fong et al.
(Continued)

FOREIGN PATENT DOCUMENTS

EP 1133112 A2 9/2001
EP 1890438 A1 2/2008
(Continued)

OTHER PUBLICATIONS

Foreign Communication From A Counterpart Application, European Application No. 16189630.3, Extended European Search Report dated Feb. 7, 2017, 9 pages.

*Primary Examiner* — Ajay Cattungal
(74) *Attorney, Agent, or Firm* — Conley Rose, P.C.

(57) ABSTRACT

A method for packet forwarding based on equal-cost multi-path and a network device, in order to resolve problems that are caused by inconsistent forwarding paths for packets in two directions of a same service flow in an equal-cost multi-path scenario. A first network device performs calculation on characteristic information in a packet using a hash algorithm to obtain a hash value, determines, according to a correspondence between hash values and path identifiers that is acquired in advance, a path identifier corresponding to the hash value, and forwards the packet to a second network device through a path that corresponds to the path identifier, where the path is one of the N equal-cost paths. There exist N equal-cost paths for packet forwarding between the first network device and the second network device. The same hash algorithm is configured on the two network devices respectively.

16 Claims, 3 Drawing Sheets (51) Int. Cl.
*H04L 12/801* (2013.01)
*H04L 29/12* (2006.01)
*H04L 12/721* (2013.01)

(56) References Cited

U.S. PATENT DOCUMENTS

| | | | | |
|---|---|---|---|---|
| 2011/0063979 | A1* | 3/2011 | Matthews | H04L 45/302 |
| | | | | 370/237 |
| 2013/0107712 | A1* | 5/2013 | Allan | H04L 45/24 |
| | | | | 370/235 |
| 2016/0127168 | A1* | 5/2016 | Ramalingam | H04L 41/0654 |
| | | | | 370/216 |
| 2016/0261500 | A1* | 9/2016 | Revah | H04L 45/7453 |

FOREIGN PATENT DOCUMENTS

| | | |
|---|---|---|
| EP | 2633654 A1 | 9/2013 |
| WO | 2012056404 A1 | 5/2012 |

\* cited by examiner

METHOD FOR PACKET FORWARDING BASED ON EQUAL-COST MULTI-PATH AND NETWORK DEVICE

CROSS-REFERENCE TO RELATED APPLICATION

This application claims priority to Chinese Patent Application No. 201510615948.2, filed on Sep. 24, 2015, which is hereby incorporated by reference in its entirety.

TECHNICAL FIELD

The present disclosure relates to communications technologies, and in particular, to a method for packet forwarding based on equal-cost multi-path (ECMP) and a network device.

BACKGROUND

ECMP means that there exist multiple routing paths that have an equal cost but different intermediate nodes bound for a same destination Internet Protocol (IP) address or a same destination network segment. Traffic sent to a same destination IP address or a same destination network segment can be sent through different paths to implement network load balancing when a network device supports ECMP. Another normal path takes the place of a failed path to complete forwarding processing when the path fails, thereby implementing redundancy backup of a route.

Figure 1:
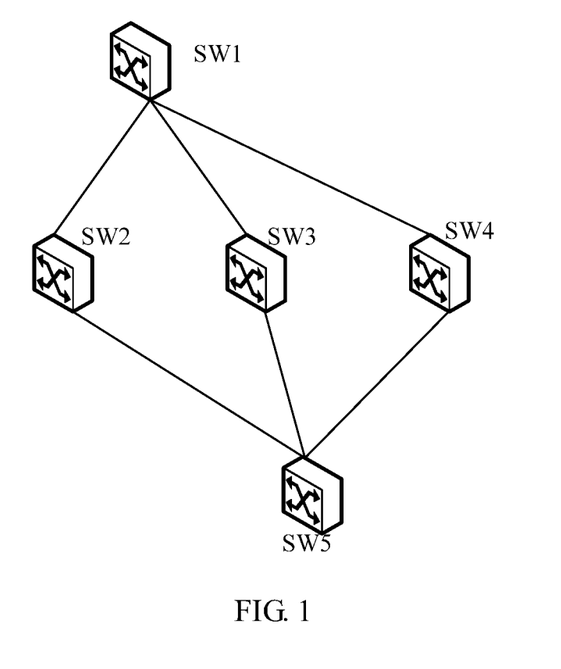
FIG. 1 is a schematic structural diagram of a network including multiple equal-cost paths.

Referring to FIG. 1, FIG. 1 is a schematic structural diagram of a network including ECMPs. When data packets are forwarded between switch (SW) 1 and SW5, any one of three paths may be used for forwarding. The three paths are respectively: SW1→SW2→SW5, SW1→SW3→SW5, and SW1→SW4→SW5.

Existence of the ECMPs may cause that a path for packets in one direction of a service flow is different from a path for packets in the other direction. For example, in FIG. 1, in one session, packets sent from SW1 to SW5 are routed to SW5 along the path SW1→SW2→SW5, while packets sent from SW5 to SW1 are routed to SW1 along a path SW5→SW3→SW1. This inconsistency in forwarding paths for packets in two directions of a same service flow increases difficulties in network maintenance, fault diagnosis, and deployment of a session detection-based network device (for example, a firewall).

SUMMARY

Embodiments of the present disclosure provide a method for packet forwarding based on ECMP and a network device, in order to resolve prior-art difficulties in network maintenance, fault diagnosis, and deployment of a session detection-based network device (for example, a firewall) that are caused by inconsistent forwarding paths for packets in two directions of a same service flow in an ECMP scenario.

According to a first aspect, an embodiment of the present disclosure provides a method for packet forwarding based on ECMP, where the method is applied to a network including a first network device and a second network device, N equal-cost paths exist between the first network device and the second network device, where N is a positive integer greater than or equal to 2, and a same hash algorithm is configured on the first network device and the second network device respectively, and the method includes determining, by the first network device, a packet that needs to be sent to the second network device, and performing calculation on characteristic information in the packet using the hash algorithm to obtain a hash value, determining, by the first network device according to a correspondence between hash values and path identifiers that is acquired in advance, a path identifier corresponding to the hash value, where a method in which the first network device acquires the correspondence between hash values and path identifiers is the same as a method in which the second network device acquires the correspondence between hash values and path identifiers, and forwarding, by the first network device, the packet to the second network device through a path that corresponds to the path identifier, where the path is one of the N equal-cost paths.

According to a second aspect, an embodiment of the present disclosure provides a network device, where the network device is a first network device, the first network device is applied to a network that includes the first network device and a second network device, N equal-cost paths exist between the first network device and the second network device, where N is a positive integer greater than or equal to 2, and a same hash algorithm is configured on the first network device and the second network device respectively, and the first network device includes a processing unit configured to determine a packet that needs to be sent to the second network device and perform calculation on characteristic information of the packet using the hash algorithm to obtain a hash value, and determine, according to a correspondence between hash values and path identifiers that is acquired in advance, a path identifier corresponding to the hash value, where a method in which the processing unit acquires the correspondence between hash values and path identifiers is the same as a method in which the second network device acquires the correspondence between hash values and path identifiers, and a transceiver unit configured to forward the packet to the second network device through a path that corresponds to the path identifier, where the path is one of the N equal-cost paths.

According to a third aspect, an embodiment of the present disclosure provides a network device, wherein the network device is a first network device, the first network device is applied to a network that comprises the first network device and a second network device, N equal-cost paths exist between the first network device and the second network device, wherein N is a positive integer greater than or equal to 2, and a same hash algorithm is configured on the first network device and the second network device respectively, and the first network device comprises a memory and a processor. The memory is configured to store program code, and the processor is configured to call the program code in order to execute the following method which includes determining a packet that needs to be sent to the second network device, performing calculation on characteristic information of the packet using the hash algorithm to obtain a hash value, determining, according to a correspondence between hash values and path identifiers that is acquired in advance, a path identifier corresponding to the hash value, wherein a method in which the processing unit acquires the correspondence between hash values and path identifiers is the same as a method in which the second network device acquires the correspondence between hash values and path identifiers, and forwarding the packet to the second network device through a path that corresponds to the path identifier, wherein the path is one of the N equal-cost paths.

In the embodiments of the present disclosure, a same symmetric hash algorithm is configured on a first network device and a second network device respectively, and a same method is used to determine a correspondence between hash values and path identifiers. Therefore, the first network device may forward a packet to the second network device through a path corresponding to a determined path identifier, and the second network device may also send a packet to the first network device through the path when needing to send the packet to the first network device. Therefore, a packet in forward flow sent by the first network device to the second network device is routed along a same path as a packet in reverse flow sent by the second network device to the first network device, which resolves difficulties increasing in network maintenance, fault diagnosis, and deployment of a session detection-based network device (for example, a firewall) that are caused by inconsistent forward and reverse flow paths.

DESCRIPTION OF EMBODIMENTS

To make the objectives, technical solutions, and advantages of the present disclosure clearer, the following further describes the present disclosure in detail with reference to the accompanying drawings.

The embodiments of the present disclosure provide a method for packet forwarding based on ECMP and a network device, in order to resolve prior-art difficulties in network maintenance, fault diagnosis, and deployment of a session detection-based network device (for example, a firewall) that are caused by inconsistent forwarding paths for packets in two directions of a same service flow in an ECMP scenario. The method and the network device are based on a same inventive concept. Because the method and the network device resolve problems using similar principles, mutual reference may be made for implementation of the network device and implementation of the method, and what is same for both is not repeatedly described.

The embodiments of the present disclosure are applied to a network. The network includes a first network device and a second network device, and there exist ECMPs for packet forwarding between the first network device and the second network device. A same hash algorithm is configured on the first network device and the second network device respectively. For example, as shown in FIG. 1, any one of three paths may be used for forwarding when packets are forwarded between SW1 and SW5. The three paths are respectively, SW1→SW2→SW5, SW1→SW3→SW5, and SW1→SW4→SW5. The ECMPs are all shortest paths from the first network device to the second network device. The first network device and the second network device each may be a network device used for packet forwarding, for example, a routing network device or a switching network device. Further, a path identifier corresponding to each path in ECMPs may be configured for the first network device and the second network device by a manager managing the first network device and the second network device. In another implementation, a path identifier corresponding to each path in ECMPs may be configured by the first network device and the second network device respectively according to a same configuration rule.

Figure 2:
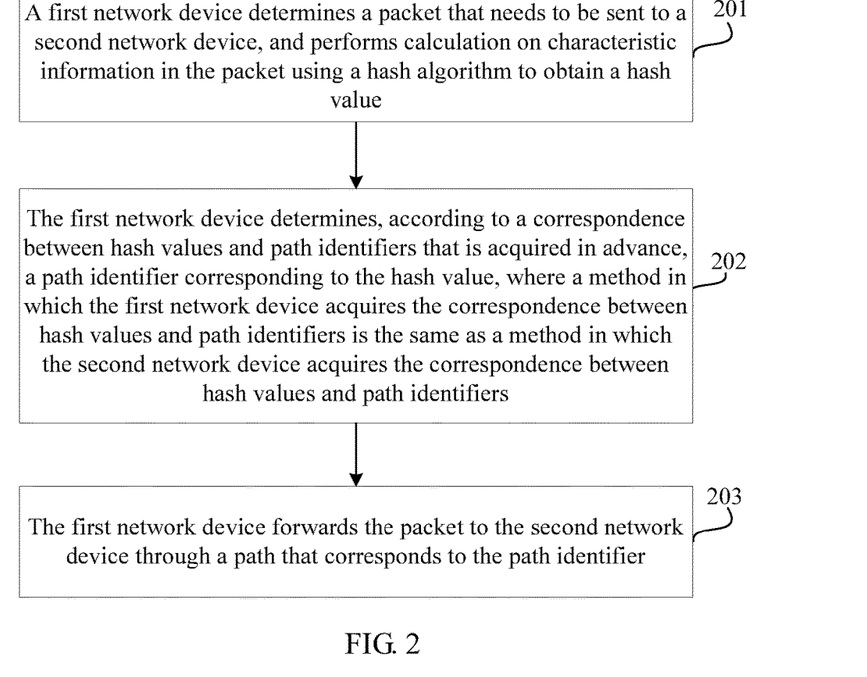
FIG. 2 is a flowchart of a method for packet forwarding based on ECMP according to an embodiment of the present disclosure.

Based on the above description, an embodiment of the present disclosure provides a method for packet forwarding based on ECMP. As shown in FIG. 2, the method includes the following steps.

Step 201: A first network device determines a packet that needs to be sent to a second network device, and performs calculation on characteristic information in the packet using the hash algorithm to obtain a hash value.

The characteristic information of the packet includes at least one of a source IP address and a destination IP address, or a source port number and a destination port number. The characteristic information may further include a protocol type.

A service flow may be a Transmission Control Protocol (TCP) or User Datagram Protocol (UDP) service flow, or the like. A service flow includes a forward flow and a reverse flow. A source IP address of the forward flow is a destination IP address of the reverse flow, and a destination IP address of the forward flow is a source IP address of the reverse flow. A source port number of the forward flow is a destination port number of the reverse flow, and a destination port number of the forward flow is a source port number of the reverse flow.

The hash algorithm is a symmetric hash algorithm. The symmetric hash algorithm refers to a hash algorithm according to which a same hash result is obtained by hash computing on an original quintuple and a symmetric quintuple of the packet. The symmetric quintuple is obtained by interchanging a source IP address and a destination IP address in the original quintuple of the packet and interchanging a source port number and a destination port number in the original quintuple of the packet.

Hash values obtained by hash computing on characteristic information of packets that are included in traffic in two different directions of a same service flow are the same when a same symmetric hash algorithm is used by the first network device and the second network device on the characteristic information of received packets.

Step 202: The first network device determines, according to a correspondence between hash values and path identifiers that is acquired in advance, a path identifier corresponding to the hash value, where a method in which the first network device acquires the correspondence between hash values and path identifiers is the same as a method in which the second network device acquires the correspondence between hash values and path identifiers.

The correspondence between hash values and path identifiers refers to a one-to-one correspondence between hash values and path identifiers, that is, one hash value corresponds to one path identifier.

Step 203: The first network device forwards the packet to the second network device through a path that corresponds to the path identifier, where the path is one of the N equal-cost paths.

In this embodiment of the present disclosure, a same symmetric hash algorithm is configured on a first network device and a second network device respectively, and a same method is used to determine a correspondence between hash values and path identifiers. Therefore, the first network device may forward a packet to the second network device through a path corresponding to a determined path identifier, and when needing to send a packet to the first network device, the second network device may also send the packet to the first network device through the path. Therefore, a packet in forward flow sent by the first network device to the second network device is routed along a same path as a packet in reverse flow sent by the second network device to the first network device, which resolves difficulties increasing in network maintenance, fault diagnosis, and deployment of a session detection-based network device (for example, a firewall) that are caused by inconsistent forward and reverse flow paths.

Optionally, that the first network device and the second network device obtain the correspondence between hash values and path identifiers may be implemented in the following manner, which is described using the first network device as an example:

A: The first network device determines routing information of each path of the N equal-cost paths existing between the first network device and the second network device.

B: The first network device obtains a next-hop router identifier in the routing information of each path of the N equal-cost paths.

The next-hop router identifier may be a next-hop network device identifier, or a next-hop network device IP address, or the like.

C: The first network device uses the next-hop router identifier of each path as a path identifier of the path, and sequences the N equal-cost paths according to the path identifier of each path of the N equal-cost paths to obtain a sequencing result.

D: The first network device determines, according to the sequencing result, a path identifier corresponding to each hash value to obtain the correspondence between hash values and path identifiers.

Optionally, the first network device may determine the routing information of each path of the N equal-cost paths existing between the first network device and the second network device using a routing protocol.

The routing protocol may be Intermediate System to Intermediate System (IS-IS), or Open Shortest Path First (OSPF), or the Border Gateway Protocol (BGP), or the like. Any routing protocol that can be used to determine the routing information of each path of the N equal-cost paths existing between the first network device and the second network device is applicable to this embodiment of the present disclosure, which is not further limited hereby in this embodiment of the present disclosure.

In step C, sequencing the N equal-cost paths according to the path identifier of each path of the N equal-cost paths may be implemented in the following manner.

Values of the N path identifiers of the N equal-cost paths are sequenced, where a descending order or an ascending order may be used for the sequencing. For example, in FIG. 1, if a network device identifier is used as a next-hop router identifier and further as a path identifier, for SW1, three equal-cost paths exist between SW1 and SW5, and path identifiers of the three equal-cost paths are SW2, SW3, and SW4 respectively. After SW1 sequences the three equal-cost paths, an obtained order may be (SW2, SW3, SW4) or (SW4, SW3, SW2).

In step D, determining, according to the sequencing result, a path identifier corresponding to each hash value to obtain the correspondence between hash values and path identifiers may be implemented in the following manner.

The N path identifiers are made, according to the sequencing result, to correspond to hash values 0 to N−1 respectively in sequence to obtain the correspondence between hash values and path identifiers. FIG. 1 is still used as an example. Assuming that the sequencing result of the path identifiers of the three equal-cost paths existing between SW1 and SW5 is (SW2, SW3, SW4), the correspondence established between hash values and path identifiers is shown in Table 1.

TABLE 1

| Hash value | Path identifier |
|---|---|
| 0 | SW2 |
| 1 | SW3 |
| 2 | SW4 |

In another embodiment, the next-hop router identifier may alternatively be an IP address. Assuming that IP addresses of SW2, SW3, and SW4 are IP2, IP3, and IP4 respectively, and IP3<IP2<IP4, the sequencing result of the three paths between SW1 and SW5 is (IP3, IP2, IP4), and the correspondence established between hash values and path identifiers is shown in Table 2.

TABLE 2

| Hash value | Path identifier |
|---|---|
| 0 | IP3 |
| 1 | IP2 |
| 2 | IP4 |

Similarly, SW5 may determine three paths existing between SW5 and SW1 using the routing protocol: SW5→SW2→SW1, SW5→SW3→SW1, and SW5→SW4→SW1. The three paths include next-hop router identifiers. Next hops of SW5 herein are SW2, SW3, and SW4. The network device identifiers or IP addresses of SW2, SW3, and SW4 may be sequenced. The hash value of each path determined by SW5 finally is the same as the hash value of the path determined by SW1 when a same sequencing method is applied by SW5 and SW1 to the three paths.

It is assumed that SW1 determines that packet 1 needs to be sent to SW5, and that characteristic information of packet 1 includes a source IP address a, a destination IP address b, a source port number Port 1, and a destination port number Port 2. Then SW1 performs calculation on the characteristic information based on a symmetric hash algorithm to obtain a calculated value, which is assumed to be 11. Then a hash value is obtained by finding a remainder of the calculated value divided by the quantity of paths 3, that is, 11%3=2. A corresponding next hop of the hash value 2 is SW4, and SW1 forwards the packet 2 to SW5 through SW4. On the contrary, it is assumed that SW5 determines that packet 2 needs to be sent to SW1. Packet 2 is a packet in a reverse flow of a service flow corresponding to packet 1. Then, characteristic information of packet 2 includes a source IP address b, a destination IP address a, a source port number Port 2, and a destination port number Port 1. Although a quintuple of packet 2 is not the same as a quintuple of packet 1, because a symmetric hash algorithm is used, a calculated value obtained by SW5 for the characteristic information of packet 2 based on the hash algorithm is also 11. A hash value obtained by SW5 by finding a remainder of the calculated value 11 divided by the quantity of paths 3 is 2. A next hop corresponding to the hash value 2 is SW4. Then SW5 forwards packet 2 to SW1 through SW4. In this way, packets sent in the two directions between SW1 and SW5 are transmitted along the same path.

In the foregoing embodiment, the present disclosure is described using an example in which one intermediate network device exists between SW1 and SW5. A person skilled in the art should understand that the present disclosure may also be applied to a scenario in which multiple network devices exist between a first network device and a second network device. In such a scenario, each path can be divided into multiple sub-paths, and the foregoing method in this embodiment of the present disclosure is applicable to each sub-path.

For example, two equal-cost paths exist between SW1 and SW5, SW1→SW2→SW6→SW5 and SW1→SW3→SW7→SW5. SW1→SW2→SW6→SW5 is used as an example. A symmetric hash algorithm needs to be configured on each network device in the path, and a correspondence between hash values and path identifiers is established according to the foregoing rule. In this way, it can still be ensured that packets in different directions of a same service flow are routed along a same forwarding path when the packets are forwarded.

Based on the same inventive concept as the embodiment described in FIG. 2, an embodiment of the present disclosure further provides a network device for packet forwarding based on ECMP. The network device for packet forwarding based on ECMP may be the foregoing first network device, or may be the foregoing second network device. In addition, the "first" and "second" in the first network device and the second network device in this embodiment of the present disclosure are only for distinguishing the two network devices and do not mean that the two network devices are technically different when implementing the present disclosure.

The following is described using an example in which the network device is the first network device.

The first network device is applied to a network including the first network device and the second network device. N equal-cost paths exist between the first network device and the second network device, where N is a positive integer greater than or equal to 2, and a same hash algorithm is configured on the first network device and the second network device respectively.

Figure 3:
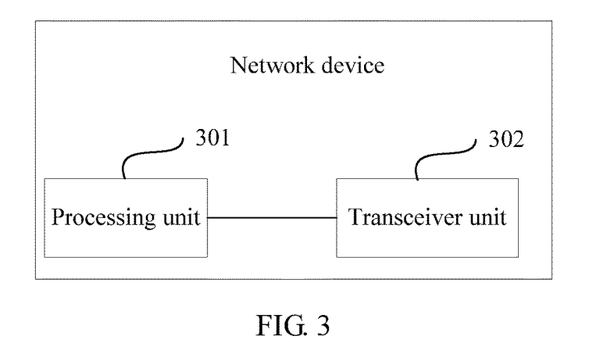
FIG. 3 is a schematic structural diagram of a network device according to an embodiment of the present disclosure.

As shown in FIG. 3, a network device includes a processing unit 301 and a transceiver unit 302.

The processing unit 301 is configured to determine a packet that needs to be sent to the second network device, and perform calculation on characteristic information of the packet using the hash algorithm to obtain a hash value, and determine, according to a correspondence between hash values and path identifiers that is acquired in advance, a path identifier corresponding to the hash value, where a method in which the processing unit acquires the correspondence between hash values and path identifiers is the same as a method in which the second network device acquires the correspondence between hash values and path identifiers.

The characteristic information of the packet includes at least one of a source IP address and a destination IP address, or a source port number and a destination port number.

The transceiver unit 302 is configured to forward the packet to the second network device through a path that corresponds to the path identifier and that is determined by the processing unit 301, where the path is one of the N equal-cost paths.

Optionally, the processing unit 301 may obtain the correspondence between hash values and path identifiers in the following manner which includes determining routing information of each path of the N equal-cost paths existing between the first network device and the second network device, obtaining a next-hop router identifier in the routing information of each path of the N equal-cost paths, using the next-hop router identifier of each path as a path identifier of the path, and sequencing the N equal-cost paths according to the path identifier of each path of the N equal-cost paths to obtain a sequencing result, and determining, according to the sequencing result, a path identifier corresponding to each hash value to obtain the correspondence between hash values and path identifiers.

Optionally, the processing unit 301 may determine, in the following manner, the routing information of each path of the N equal-cost paths existing between the first network device and the second network device using IS-IS to determine the routing information of each path of the N equal-cost paths existing between the first network device and the second network device, or using OSPF to determine the routing information of each path of the N equal-cost paths existing between the first network device and the second network device, or using the BGP to determine the routing information of each path of the N equal-cost paths existing between the first network device and the second network device.

Optionally, the processing unit 301 may implement, in the following manner, where sequencing the N equal-cost paths according to the path identifier of each path of the N equal-cost paths includes sequencing values of the N path identifiers of the N equal-cost paths to obtain the sequencing result.

The processing unit 301 may implement, in the following manner, where determining, according to the sequencing result, a path identifier corresponding to each hash value to obtain the correspondence between hash values and path identifiers includes mapping, according to the sequencing result, the N path identifiers to hash values 0 to N−1 respectively in sequence to obtain the correspondence between hash values and path identifiers.

In this embodiment of the present disclosure, a same symmetric hash algorithm is configured on a first network device and a second network device respectively, and a same method is used to determine a correspondence between hash values and path identifiers. Therefore, the first network device may forward a packet to the second network device through a path corresponding to a determined path identifier, and when needing to send a packet to the first network device, the second network device may also send the packet to the first network device through the path. Therefore, a packet in forward flow sent by the first network device to the second network device is routed along a same path as a packet in reverse flow sent by the second network device to the first network device, which resolves difficulties increasing in network maintenance, fault diagnosis, and deployment of a session detection-based network device (for example, a firewall) that are caused by inconsistent forward and reverse flow paths.

An embodiment of the present disclosure further provides a network device for packet forwarding based on ECMP. The network device for packet forwarding based on ECMP may be the foregoing first network device, or may be the foregoing second network device. N equal-cost paths exist between the first network device and the second network device, where N is a positive integer greater than or equal to 2. A same hash algorithm is configured on the first network device and the second network device respectively.

Figure 4:
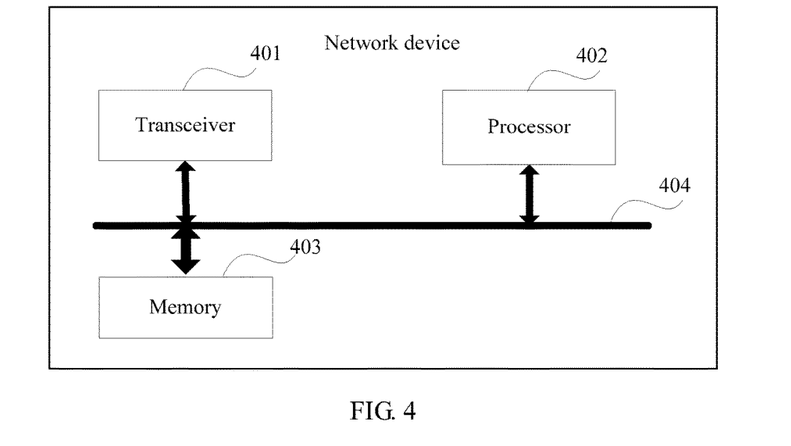
FIG. 4 is a schematic structural diagram of another network device according to an embodiment of the present disclosure.

As shown in FIG. 4, a network device includes a transceiver 401, a processor 402, and a memory 403. The transceiver 401, the processor 402, and the memory 403 are interconnected. A specific connection medium between the foregoing components is not limited in this embodiment of the present disclosure. In FIG. 4, in this embodiment of the present disclosure, the memory 403, the processor 402, and the transceiver 401 are connected using a bus 404, where the bus is represented by a bold line in FIG. 4. This is only a schematic illustration and is not intended for limitation. There may be other connection manners between the components though. The bus may be an address bus, a data bus, a control bus, and the like. For ease of representation, the bus is only represented in one bold line in FIG. 4, but it does not mean that there is only one bus or one type of bus.

The memory 403 in this embodiment of the present disclosure is configured to store program code or an instruction executed by the processor 402. The memory 403 may be a volatile memory, such as a random access memory (RAM), or the memory 403 may be a non-volatile memory, such as a read-only memory (ROM), a flash memory, a hard disk drive (HDD) or a solid state drive (SSD), or the memory 403 may be, but is not limited to any other medium that is capable of carrying or storing desired program code in a form of instructions or data structures and that is accessible by a computer. The memory 403 may be a combination of the foregoing memories. The memory 403 further stores a configured hash algorithm and a correspondence between hash values and path identifiers that is acquired in advance.

In this embodiment of the present disclosure, the processor 402 may be a central processing unit (CPU).

The processor 402 is configured to call the program code or instruction stored in the memory 403 in order to perform the method shown in FIG. 2.

The network device shown in FIG. 4 of the present disclosure can perform the method shown in FIG. 2 and can achieve the same technical effect as the network device shown in FIG. 3. A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact disc read-only memory (CD-ROM), an optical memory, and the like) that include computer-usable program code.

Although some embodiments of the present disclosure have been described, a person skilled in the art can make changes and modifications to these embodiments once they learn the basic inventive concept. Therefore, the following claims are intended to be construed as to cover the above embodiments and all changes and modifications falling within the scope of the present disclosure.

Obviously, a person skilled in the art can make various modifications and variations to the embodiments of the present disclosure without departing from the scope of the embodiments of the present disclosure. The present disclosure is intended to cover these modifications and variations provided that they fall within the scope of protection defined by the following claims and their equivalent technologies.

What is claimed is:

1. A method for packet forwarding based on equal-cost multi-path, the method being applied to a network comprising a first network device and a second network device, N equal-cost paths existing between the first network device and the second network device, N being a positive integer greater than or equal to two, a same hash algorithm being configured on the first network device and the second network device respectively, and the method comprising:
    determining, by the first network device, a packet that needs to be sent to the second network device;
    performing calculation on characteristic information of the packet using the hash algorithm to obtain a hash value;
    determining, by the first network device according to a correspondence between hash values and path identifiers that is acquired in advance, a path identifier corresponding to the hash value, a first method in which the first network device acquires the correspondence between the hash values and the path identifiers being the same as a second method in which the second network device acquires the correspondence between the hash values and the path identifiers; and
    forwarding, by the first network device, the packet to the second network device through a path that corresponds to the path identifier, the path being one of the N equal-cost paths, and when the first network device acquires the correspondence between the hash values and the path identifiers, the method further comprises:
    determining, by the first network device, routing information of each path of the N equal-cost paths;
    obtaining, by the first network device, a next-hop router identifier in the routing information of each path of the N equal-cost paths;
    using, by the first network device, the next-hop router identifier of each path as a path identifier of the path;
    sequencing, by the first network device, the N equal-cost paths according to the path identifier of each path of the N equal-cost paths to obtain a result obtained by the sequence; and
    determining, by the first network device according to the result obtained by the sequencing, a path identifier corresponding to each hash value to obtain the correspondence between the hash values and the path identifiers.

2. The method of claim 1, wherein the characteristic information of the packet comprises a source Internet Protocol (IP) address and a destination IP address.

3. The method of claim 1, wherein the characteristic information of the packet comprises a source port number and a destination port number.

4. The method of claim 1, wherein determining the routing information of each path of the N equal-cost paths comprises determining, by the first network device, the routing information of each path of the N equal-cost paths using Intermediate System to Intermediate System (IS-IS).

5. The method of claim 4, wherein sequencing the N equal-cost paths to obtain the result obtained by the sequencing comprises sequencing values of N path identifiers of the N equal-cost paths to obtain the result obtained by the sequencing, and determining, the path identifier corresponding to each hash value to obtain the correspondence between the hash values and the path identifiers comprises mapping, according to the result obtained by the sequencing, the N path identifiers to hash values zero to N−1 respectively in sequence to obtain the correspondence between the hash values and the path identifiers.

6. The method of claim 1, wherein determining the routing information of each path of the N equal-cost paths comprises determining, by the first network device, the routing information of each path of the N equal-cost paths using Open Shortest Path First (OSPF).

7. The method of claim 1, wherein determining the routing information of each path of the N equal-cost paths comprises determining, by the first network device, the routing information of each path of the N equal-cost paths using Border Gateway Protocol (BGP).

8. The method of claim 1, wherein sequencing the N equal-cost paths to obtain the result obtained by the sequencing comprises sequencing values of N path identifiers of the N equal-cost paths to obtain the result obtained by the sequencing, and determining the path identifier corresponding to each hash value to obtain the correspondence between the hash values and the path identifiers comprises mapping, according to the result obtained by sequencing, the N path identifiers to hash values zero to N−1 respectively in sequence to obtain the correspondence between the hash values and the path identifiers.

9. A network device, the network device being a first network device, the first network device being applied to a network that comprises the first network device and a second network device, N equal-cost paths existing between the first network device and the second network device, N being a positive integer greater than or equal to two, a same hash algorithm being configured on the first network device and the second network device respectively, and the first network device comprising:
  a memory configured to store a program code; and
  a processor coupled to the memory and configured to call the program code in order to execute the following operations:
    determine a packet that needs to be sent to the second network device;
    perform calculation on characteristic information of the packet using the hash algorithm to obtain a hash value;
    determine, according to a correspondence between hash values and path identifiers that is acquired in advance, a path identifier corresponding to the hash value, a first method in which the processor acquires the correspondence between the hash values and the path identifiers is the same as a second method in which the second network device acquires the correspondence between the hash values and the path identifiers; and
    forward the packet to the second network device through a path that corresponds to the path identifier, the path being one of the N equal-cost paths, and when obtaining the correspondence between the hash values and the path identifiers, the processor is further configured to call the program code in order to execute the following operations:
      determine routing information of each path of the N equal-cost paths;
      obtain a next-hop router identifier in the routing information of each path of the N equal-cost paths;
      use the next-hop router identifier of each path as a path identifier of the path;
      sequence the N equal-cost paths according to the path identifier of each path of the N equal cost paths to obtain a result obtained by the sequence; and
      determine, according to the result obtained by the sequencing, a path identifier corresponding to each hash value to obtain the correspondence between the hash values and the path identifiers.

10. The network device of claim 9, wherein the characteristic information of the packet comprises a source Internet Protocol (IP) address and a destination IP address.

11. The network device of claim 9, wherein the characteristic information of the packet comprises a source port number and a destination port number.

12. The network device of claim 9, wherein when determining the routing information of each path of the N equal-cost paths, the processor is further configured to call the program code in order to execute the operation of determining the routing information of each path of the N equal-cost paths using Intermediate System to Intermediate System (IS-IS).

13. The network device of claim 9, wherein when determining the routing information of each path of the N equal-cost paths, the processor is further configured to call the program code in order to execute the operation of determining the routing information of each path of the N equal-cost paths using Open Shortest Path First (OSPF).

14. The network device of claim 9, wherein when determining the routing information of each path of the N equal-cost paths, the processor is further configured to call the program code in order to execute the operation of determining the routing information of each path of the N equal-cost paths using Border Gateway Protocol (BGP).

15. The network device of claim 9, wherein sequencing the N equal-cost paths to obtain the result obtained by the sequencing, the processor is further configured to call the program code in order to execute the operation of sequencing values of N path identifiers of the N equal-cost paths to obtain the result obtained by the sequencing, and determining, the path identifier corresponding to each hash value to obtain the correspondence between the hash values and the path identifiers, the processor is further configured to call the program code in order to execute the operation of mapping, according to the result obtained by the sequencing, the N path identifiers to hash values zero to N−1 respectively in sequence to obtain the correspondence between the hash values and the path identifiers.

16. The network device of claim 9, wherein sequencing the N equal-cost paths to obtain the result obtained by the sequencing, the processor is further configured to call the program code in order to execute the operation of sequencing values of N path identifiers of the N equal-cost paths to obtain the result obtained by the sequencing, and determining the path identifier corresponding to each hash value to obtain the correspondence between the hash values and the path identifiers, the processor is further configured to call the program code in order to execute the operation of mapping, according to the result obtained by the sequencing, the N path identifiers to hash values zero to N−1 respectively in sequence to obtain the correspondence between the hash values and the path identifiers.

* * * * *